US011758853B2

(12) United States Patent
Buelow

(10) Patent No.: US 11,758,853 B2
(45) Date of Patent: Sep. 19, 2023

(54) FIXTURELESS LAMP

(71) Applicant: Just Greens LLC, Newark, NJ (US)

(72) Inventor: Roger Buelow, Pepper Pike, OH (US)

(73) Assignee: AeroFarms, Inc., Newark, NJ (US)

( * ) Notice: Subject to any disclaimer, the term of this patent is extended or adjusted under 35 U.S.C. 154(b) by 188 days.

(21) Appl. No.: 17/179,608

(22) Filed: Feb. 19, 2021

(65) Prior Publication Data
US 2021/0169015 A1 Jun. 10, 2021

Related U.S. Application Data

(63) Continuation of application No. 16/039,933, filed on Jul. 19, 2018, now abandoned.

(51) Int. Cl.
| A01G 7/04 | (2006.01) |
| A01G 31/02 | (2006.01) |
| F21V 31/00 | (2006.01) |
| F21V 19/00 | (2006.01) |
| F21V 23/06 | (2006.01) |
| F21V 29/503 | (2015.01) |
| F21S 4/28 | (2016.01) |
| F21Y 115/10 | (2016.01) |

(52) U.S. Cl.
CPC ............. *A01G 7/045* (2013.01); *A01G 31/02* (2013.01); *F21S 4/28* (2016.01); *F21V 19/008* (2013.01); *F21V 23/06* (2013.01); *F21V 29/503* (2015.01); *F21V 31/005* (2013.01); *F21Y 2115/10* (2016.08)

(58) Field of Classification Search
CPC ...... F21V 29/503; F21V 19/008; F21V 23/06; F21V 31/005; F21S 4/28; A01G 7/045
See application file for complete search history.

(56) References Cited

U.S. PATENT DOCUMENTS

| 3,779,564 A | 12/1973 | Chookazian |
| 4,045,911 A | 9/1977 | Ware |
| 4,803,600 A | 2/1989 | Pepping |
| 5,132,885 A | 7/1992 | Hocheim et al. |
| 6,283,612 B1 | 9/2001 | Hunter |
| 6,523,975 B1 | 2/2003 | Plourde et al. |

(Continued)

FOREIGN PATENT DOCUMENTS

| CN | 1261470 A | 7/2000 |
| CN | 104266095 A | 1/2015 |

(Continued)

OTHER PUBLICATIONS

PCT International Search Report and Written Opinion dated Oct. 30, 2019 for PCT/US2019/042412.

(Continued)

*Primary Examiner* — William N Harris
(74) *Attorney, Agent, or Firm* — McCarter & English, LLP; John E. Pillion

(57) ABSTRACT

The present disclosure provides advantageous lighting systems that can be installed on parallel rows of horizontal supports. The lighting systems can be configured to have a single electrical feedthrough on one end of the lamp that can also act as a mating feature between the lamp and supports. More particularly, the present disclosure provides improved lighting systems that are fixtureless, waterproof, customizable, and easy to install/remove.

7 Claims, 8 Drawing Sheets

(56) References Cited

U.S. PATENT DOCUMENTS

| | | |
|---|---|---|
| 6,632,100 B1 | 10/2003 | Richardson |
| 7,021,799 B2 | 4/2006 | Mizuyoshi |
| 7,338,182 B1 | 3/2008 | Hastings et al. |
| 7,575,338 B1 | 8/2009 | Verfuerth |
| 7,824,072 B2 | 11/2010 | Cheng et al. |
| 8,038,324 B2 | 10/2011 | Chen |
| 8,115,393 B2 | 2/2012 | Neal et al. |
| 8,360,599 B2 * | 1/2013 | Ivey .................. F21V 29/70 362/225 |
| 8,491,142 B2 | 7/2013 | Bae |
| 8,545,057 B2 | 10/2013 | Igaki |
| 8,628,228 B2 | 1/2014 | Lundy |
| 8,956,013 B1 | 2/2015 | Shew |
| 9,228,727 B2 | 1/2016 | May |
| 9,335,009 B2 | 5/2016 | Halliwell |
| 2003/0011308 A1 | 1/2003 | Crawford et al. |
| 2010/0110683 A1 | 5/2010 | Fang et al. |
| 2010/0284195 A1 | 11/2010 | Liu et al. |
| 2010/0304079 A1 | 12/2010 | Yang et al. |
| 2010/0327768 A1 | 12/2010 | Kong et al. |
| 2012/0099318 A1 | 4/2012 | Liu |
| 2012/0120670 A1 | 5/2012 | Hashimoto et al. |
| 2012/0162987 A1 | 6/2012 | Liu et al. |
| 2012/0300441 A1 * | 11/2012 | Thomas .................. F21V 29/71 362/225 |
| 2013/0122724 A1 | 5/2013 | Velazquez |
| 2013/0265746 A1 | 10/2013 | May |
| 2014/0078771 A1 | 3/2014 | Chen et al. |
| 2014/0293595 A1 * | 10/2014 | May .......................... F21S 2/00 362/217.05 |
| 2015/0049475 A1 * | 2/2015 | Pan .......................... F21K 9/272 362/218 |
| 2016/0069522 A1 | 3/2016 | Rao et al. |
| 2016/0100528 A1 | 4/2016 | Chow |
| 2016/0230979 A1 | 8/2016 | Kwon et al. |
| 2016/0348851 A1 | 12/2016 | Amrine, Jr. et al. |
| 2019/0059237 A1 | 2/2019 | Johnson |
| 2019/0154241 A1 | 5/2019 | Danville et al. |

FOREIGN PATENT DOCUMENTS

| | | |
|---|---|---|
| CN | 205756207 U | 12/2016 |
| CN | 106439645 A | 2/2017 |
| JP | 2011070988 A | 4/2011 |
| JP | 2015008126 A | 1/2015 |
| JP | 2015179685 A | 10/2015 |
| KR | 10-1150540 B1 | 6/2012 |
| KR | 10-2017-0087622 A | 7/2017 |
| WO | WO 2013-191690 A1 | 12/2013 |
| WO | WO 2017-134623 A1 | 8/2017 |

OTHER PUBLICATIONS

Illumitex Product Literature, P.L. Light Systems, two pages.
U.S. Appl. No. 16/039,933, filed Jul. 19, 2018, US 2020/0022313 A1.
PCT/US2019/42412, Jul. 18, 2019, WO 2020/018795.
English Translation of Chinese First Office Action dated Mar. 2, 2022 for Chinese Patent Application No. 201980058879.6.
Chinese Office Action dated Nov. 2, 2022 for Chinese Application No. 2022102802560370; See English translation of Office Action summary in Information Disclosure Statement enclosed herewith.
European Supplementary Search Report dated Apr. 11, 2022 for European Patent Application No. 19837888.7.
U.S. Appl. No. 16/039,933, filed Jul. 19, 2018.
PCT/US2019/042412, Jul. 19, 2018, WO 2020/018795.
English Translation of Chinese Third Office Action dated Apr. 3, 2023 for Chinese Application No. 201980058879.6 (the translation reflects a typo in the date of the Office Action—dated Apr. 3, 2023 is correct).

* cited by examiner

FIXTURELESS LAMP

CROSS-REFERENCE TO RELATED APPLICATION

The present application is a continuation application that claims priority benefit to a non-provisional application entitled "Fixtureless Lamp" that was filed on Jul. 19, 2018, and assigned Ser. No. 16/039,933. The entire content of the foregoing non-provisional application is incorporated herein by reference.

TECHNICAL FIELD

The present disclosure generally relates to fixtureless lighting units and, more particularly, fixtureless lighting units for growing plants.

BACKGROUND

Aeroponic growing involves spraying a liquid nutrient solution on the roots of developing plants. The roots of these plants are generally bare and suspended in a growth chamber where the nutrients are sprayed. In some versions of aeroponic farming, seeds are deposited on the top surface of a cloth that can be supported by a frame. The seeds are germinated, and then cloth on the frame is placed in the growth chamber. In the growth chamber, the upper side of the cloth is subjected to light of the proper wavelength and intensity to promote growth in the developing plants, the underside of the cloth and the developing root mass receives the nutrient solution. The plants resulting from the seeds are harvested at a desired stage of growth. The growth chambers can be stacked on each other and/or located side by side to save space within a facility and to permit sharing the subsystems which provide the nutrient solution, temperature, humidity, and carbon dioxide to the growth chambers. A rapidly developing and healthy plant canopy is beneficial in these systems because it reduces the amount of light that reaches the growth media and can reduce the formation of harmful algae growth.

Space utilization in state of the art aeroponic growing facilities is an important consideration in the design and operation of these facilities to maximize yield and reduce costs. One way to increase growing space is to locate growing towers more closely together, and in some cases to combine them. Accessibility to equipment within the tower such as fans, lighting, and nozzles needs to be accounted for when spacing growth towers more closely together.

Traditional LED lamps are difficult to install and remove because they require a force to be applied by a user grasping the lamp to engage or disengage lamp pins on the ends of the lamp from their respective sockets. This force, which can include twisting and pulling, can create strain on the housing and lead to lamp damage. The spacing of these lamps is also limited because sufficient space must be kept to allow a user's hand to grasp the lamp and apply the force to it. Installing and removing many of these lamps during the life of an aeroponic farm results in downtime, can be time consuming, and can reduce the efficiency operation.

There is a continuing need for lighting and lamps which are easy to install and remove, that reduce accessibility requirements to the lamps, and allows customized spacing to adapt lighting flux needs to growth tower requirement. Thus, an interest exists for improved lighting and lamps, and related methods of use. These and other inefficiencies and opportunities for improvement are addressed and/or overcome by the assemblies, systems and methods of the present disclosure.

SUMMARY

The present disclosure provides advantageous lighting unit for use in growing plants. More particularly, the present disclosure provides improved lighting systems that are fixtureless, waterproof, customizable, and easy to install/remove.

In exemplary embodiments, the present disclosure provides advantageous elongated LED lighting units that are adjacently located in close proximity to one another. Elongated LED lighting units include at least two endcaps, each having external surfaces, and at least one elongated transparent housing positioned therebetween. The external surfaces of the endcaps may cooperate with support brackets located on opposite sides of a support structure, e.g., an aeroponic growth tower. In one implementation the external surfaces are flat. The external flats may rest on a surface of the support brackets. The support brackets may at least partially define the boundaries of the aeroponic growth tower, and, more particularly, the growth chamber. Solid state lighting devices/LED lamps may further be located within the elongated transparent housing, thereby at least partially spanning the distance between the endcaps, the support brackets, and across the growth chamber. Solid state lighting devices may be positioned in close proximity to an elongated heat sink to facilitate heat transfer. The elongated heat sink may extend at least partially the distance between the at least two endcaps.

A first endcap of the elongated LED lighting unit may include an alignment feature that mates with a corresponding feature on a first support bracket. A second endcap, in opposition to the first endcap, includes at least one electrical connector, outfitted to enable adjacent solid state lighting devices to be electrically daisy chained thereto, and an alignment feature that mates with a corresponding feature on a second support bracket. Endcaps may include an internal surface, having a diameter slightly larger than the outside diameter of the transparent housing, wherein during installation the endcap captures a portion of the outer surface of the transparent housing. Sealing surface, positioned perpendicularly to internal surface, may capture the end portion of transparent housing. Sealing surface may further include a gasket for a watertight seal. Endcaps may further include an internal cavity/slot that longitudinally extends beyond the internal surface, wherein the internal cavity may house an LED lamp heat sink that extends beyond the transparent housing.

The lighting unit's endcaps in embodiments of the disclosure have internal flats that engage the portion of the LED lamp chassis or heat sink that extends beyond the ends of the transparent housing and the endcaps and also have a sealing surface that overlaps the end portions of the housing beyond which the LED lamp heat sink extends. The LED lamp chassis or heat sink can include threaded fixtures to attach the endcap. The combination of internal flats and sealing surfaces of the endcaps advantageously combine to strengthen the joints in the elongated LED lighting unit. The external flats and external alignment feature on each endcap cooperate to reduce stress on the joints while providing simplified alignment and robust installation of these LED lighting units with the support brackets of the growth tower.

LED lighting units in embodiments of the disclosure simplify the installation and removal of the units from support brackets. The alignment features on the opposite endcaps promote rapid and secure installation of the lighting units into the support brackets without the need for twisting and/or applying a force to the lamps to facilitate seating them within a socket. Advantageously, the disclosed LED lighting units may be assembled in close proximity to one another (and possibly in contact with one another) as a result of the ease of installation and removal (e.g., no twisting, top mounting clips, additional force, etc.).

In another exemplary embodiment, an elongated LED lighting unit may be positioned between substantially parallel and horizontal rows of first and second support brackets, wherein the first and second support brackets are positioned to directly/indirectly connect opposing vertical upright supports. The elongated LED lighting unit includes an elongated transparent housing longitudinally positioned between a first endcap and a second endcap. The first endcap, second endcap, and elongated transparent housing enclose a plurality of solid state light emitting diode devices (LEDs) that are positioned in close proximity to an elongated heat sink to facilitate heat transfer. The elongated heat sink has a first end portion that longitudinally extends beyond a first end of the transparent housing, longitudinally extending past an internal sealing surface within the first endcap, and settling in close proximity to an additional internal surface within the first endcap. The elongated heat sink further includes a second end portion that longitudinally extends beyond a second end of the transparent housing, longitudinally extending past a sealing surface within the second endcap, and settling in close proximity to an internal surface within the second endcap.

The first end cap may further include an external mating feature and an external cooperative surface which may be adapted to mate with a corresponding mating feature on a first support bracket and a surface of the first support bracket, respectively. The first endcap may include an internal surface that overlaps a portion of the first end of the transparent housing and may be used to seal the endcap with the transparent housing. The second endcap includes an electrical feedthrough and an external cooperative surface which may be adapted to contact a corresponding mating feature on a second support bracket and a surface of the second support bracket, respectively. The second endcap may further include an internal surface that overlaps a portion of the second end of the transparent housing which may be used to seal the endcap with the transparent housing. In one embodiment, the electrical connection of the endcap is the alignment feature. In some embodiments, the elongated LED lighting unit further includes the substantially parallel and substantially horizontal rows of first and second support brackets that connect the vertical upright supports in an aeroponic growing tower.

Another embodiment of the disclosure is a method of installing any one of the disclosed elongated LED lighting units. The method includes the acts or steps of positioning the first endcap of the elongated LED lighting unit, which includes an external cooperative surface and an external mating feature, with a first support bracket that further includes a corresponding mating feature. Positioning the second endcap of the elongated LED lighting unit, which includes an external cooperative surface and an electrical feedthrough, with a second support bracket that further includes a corresponding mating feature. The external cooperative surfaces of the endcaps are directly/indirectly in relation to a surface of the corresponding support brackets. The external cooperative surface and the support bracket may interface such that the two surfaces complement each other. In one embodiment, the electrical connection of the second endcap is the alignment feature. In some embodiments, the elongated LED lighting unit further includes the substantially parallel and substantially horizontal rows of first and second support brackets that connect the vertical upright supports in an aeroponic growing tower.

The present disclosure provides for an elongated LED lighting unit where the lighting unit for substantially parallel and horizontal rows of first and second support brackets connecting vertical upright supports that includes an elongated transparent housing with a first endcap that is free of an electrical connector and a second endcap that has an electrical connector. The first endcap, second endcap, and elongated transparent housing enclose a plurality of solid state lighting devices that are fixed to an elongated heat sink. The elongated heat sink has a first end portion that extends beyond a first end of the transparent housing, extends past a sealing surface in the first endcap, and contacts an internal surface in the first endcap. The elongated heat sink has a second end portion that extends beyond a second end of the transparent housing, extends past a sealing surface in the second endcap, and contacts an internal surface in the second endcap.

The present disclosure also provides for an elongated LED lighting unit including an elongated transparent housing with a longitudinal axis and a first end and a second end oppositely positioned thereon; a first endcap and a second endcap mounted with respect to the first end and the second end, wherein the second endcap includes an electrical feedthrough; an elongated heat sink including a longitudinal axis with a first end portion and a second end portion oppositely positioned thereon; and a plurality of solid state lighting devices mounted with respect to the elongated heat sink, wherein the elongated transparent housing encloses the elongated heat sink, and the first end portion and the second end portion of the elongated heat sink are mounted with respect to the first endcap and the second endcap; and wherein the first endcap and the second endcap are mounted with respect to a surface of a first support bracket and a second support bracket, connecting at least two vertical upright supports.

The present disclosure also provides for an elongated LED lighting unit wherein both the first endcap and the second endcap further include an internal cavity that extends longitudinally beyond the elongated transparent housing, wherein the elongated heat sink is mounted with respect to the internal cavity.

An elongated LED lighting unit wherein the first endcap and the second endcap further include a mating feature and the first support bracket and the second support bracket further include a corresponding mating feature.

An elongated LED lighting unit wherein the first endcap and the second endcap further include an external surface for interfacing with the first support bracket and the second support bracket. Additionally, the external cooperative surface of the first endcap or the external cooperative surface of the second endcap has a dimension that is substantially the width of the first and second support brackets.

An elongated LED lighting unit wherein the first endcap and the second end cap further include a mating feature for interfacing with the elongated transparent housing. Additionally, wherein the mating feature captures an outer surface of the elongated transparent housing.

An elongated LED lighting unit wherein the electrical feedthrough is a mating feature. Further, where the electrical feedthrough includes a waterproof seal.

An elongated LED lighting unit wherein the mating feature includes an internal surface and a sealing surface, wherein the sealing surface is substantially perpendicular to the internal surface and the internal surface and the sealing surface define a cavity. Additionally, an elongated LED lighting unit wherein the sealing surface further includes a waterproof seal for interfacing with the elongated transparent housing.

An elongated LED lighting unit wherein the first and second support brackets, interconnecting the vertical upright supports, are substantially parallel and horizontal and define an aeroponic growth module.

The present disclosure provides for a method of installing the disclosed elongated LED lighting unit onto substantially parallel and horizontal rows of first and second support brackets, connecting vertical upright supports, which includes positioning the first endcap of the elongated LED lighting unit onto the first support bracket, wherein the first endcap and the first support bracket include corresponding mating features; and positioning the second endcap of the elongated LED lighting unit and the electrical feedthrough onto a second support bracket, wherein the second endcap and the second support bracket include corresponding mating features.

The method of installing the disclosed elongated LED lighting unit which further includes securing the elongated LED light unit to one or more support brackets with a fastener.

The method of installing the disclosed elongated LED lighting unit wherein the elongated LED light unit is positioned by lowering the electrical connector into the corresponding support bracket mating feature.

The present disclosure further provides for the method of attaching a subsequent elongated LED lighting unit onto the first and second support brackets, wherein the subsequent elongated LED lighting unit further includes an electrical feedthrough mounted with respect to an endcap, wherein the electrical feedthrough of the first elongated LED lighting unit is electrically daisy chained to the electrical feedthrough of the subsequent elongated LED lighting unit.

The subsequent elongated LED lighting unit wherein the electrical feedthrough is also a mating feature.

The elongated LED lighting unit wherein the mating feature of the first and second endcaps further include an external flat surface with dimensions that are substantially the width of the first and second support brackets.

An elongated LED lighting unit wherein the first and second support brackets, interconnecting the vertical upright supports, are substantially parallel and horizontal and define an aeroponic growth module.

The method of removing the elongated LED lighting unit wherein the second endcap is lifted away from the second support bracket and the elongated LED lighting unit is lifted upwards to disengage the first endcap from the first support bracket.

Any combination or permutation of embodiments is envisioned. Additional advantageous features, functions and applications of the disclosed systems, methods and assemblies of the present disclosure will be apparent from the description which follows, particularly when read in conjunction with the appended figures. All references listed in this disclosure are hereby incorporated by reference in their entireties.

BRIEF DESCRIPTION OF THE DRAWINGS

The drawings accompanying and forming part of this specification are included to depict certain aspects of the invention. A clearer impression of the invention, and of the components, units, and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale. Embodiments of the disclosure are illustrated in the figures, like numerals being used to refer to like and corresponding parts of the various drawings.

To assist those of ordinary skill in the art in making and using the disclosed assemblies, systems and methods, reference is made to the appended figures, wherein.

DETAILED DESCRIPTION

Figure 1:
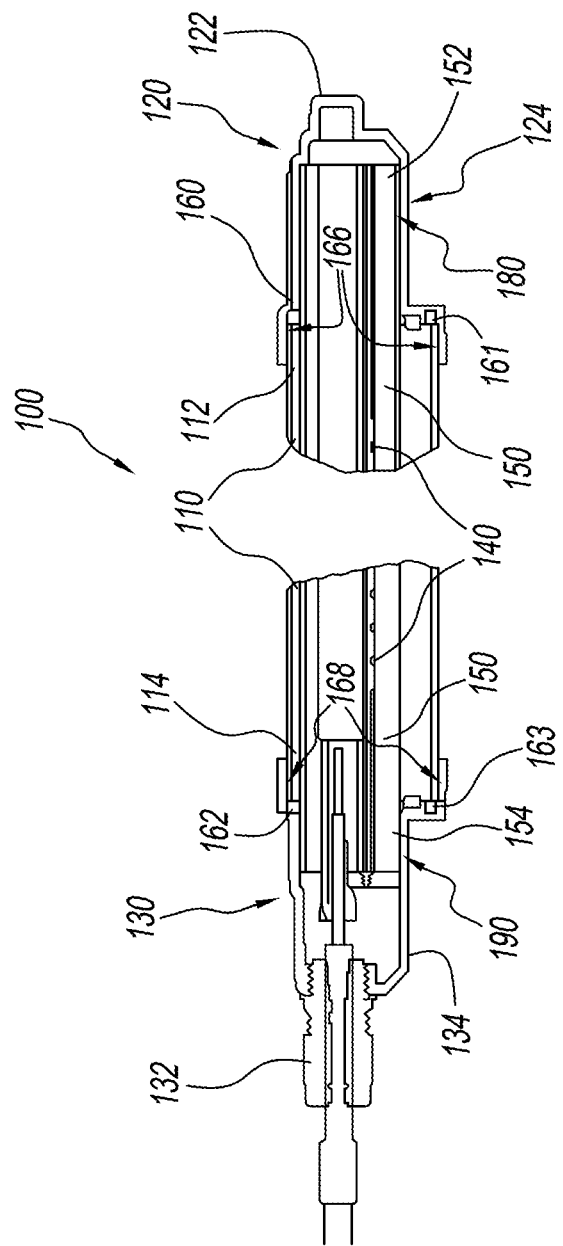
FIG. 1 is a schematic illustration of an elongated LED lighting unit of the present disclosure.

In the following description, it is understood that terms such as "top," "bottom," "outward," "inward," and the like are words of convenience and are not to be construed as limiting terms. Reference will now be made in detail to exemplary embodiments of the disclosure, which are illustrated in the accompanying figures and examples. Referring to the drawings in general, it will be understood that the illustrations are for the purpose of describing particular embodiments of the disclosure and are not intended to limit the same.

Whenever a particular embodiment of the disclosure is said to comprise or consist of at least one element of a group and combinations thereof, it is understood that the embodiment may comprise or consist of any of the elements of the group, either individually or in combination with any of the other elements of that group.

These and other aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

Furthermore, when any variable occurs more than one time in any constituent or in a formula, its definition on each occurrence is independent of its definition at every other occurrence. Also, combinations of substituents and/or variables are permissible only if such combinations result in stable compounds.

A plurality of solid state lighting devices or light emitting diode devices can be used in embodiments of the disclosure and are generally referred to as LEDs. These LEDs can be fixed or secured to a heat sink structure.

An elongated LED lighting unit in versions of the disclosure refers to an LED lighting unit that is longer than it is wide. For cylindrical LED lighting units, the length of the unit along its axis is greater than the diameter of the unit.

A mating feature of the support brackets for engagement of one or more corresponding mating feature(s) of an endcap of the elongated LED lighting unit in embodiments of the disclosure may include, but is not limited to, a recess, slot, hole(s), groove, cutout, magnet, and combinations thereof. In other embodiments, the mating feature of the support bracket may protrude from the support bracket.

A mating feature of the endcaps for engagement of one or more corresponding mating features of a support bracket may include, but is not limited to, a protrusion, pin, fin or other raised structure, magnet, and combinations thereof. In other embodiments, the mating feature of the endcap can be a recess, slot, hole(s), grove, cutout, or magnet formed into or placed onto the endcap.

In embodiments of the disclosure, an electrical feedthrough refers to a connector that at least provides electrical connection from outside the elongated LED lighting unit to the interior components of the elongated LED lighting unit. The electrical connection can provide electrical power, lamp control signals, data signals, and any combination of these between the lighting unit interior and the exterior environment. The electrical feedthrough can include one or more contact points that extend from the connector body for connection to the internal lighting unit leads. In embodiments of the disclosure, the electrical connection is fluidly sealed with a waterproof seal to an endcap of the lighting unit and prevents fluid, such as water or a nutrient solution, from penetrating the connector under a differential pressure and causing an electrical short circuit in the lighting unit. It is also important that the electrical connections are able to insulate typical tool voltages after being sealed from the fluids.

Substantially parallel and horizontal rows of first and second support brackets connecting vertical upright supports refers to support brackets that can have some variation in the degree of parallelism and horizontal orientation. For example, the rows of supports may have a small slope from end to end in the horizontal direction between frame members, for example between about 0 degrees and about 10 degrees, as measured with a level from end to end, and still be considered substantially horizontal. Similarly, the degree of parallelism of support brackets between opposing frame members can vary between about 0 degrees and about 10 degrees and still be considered parallel when measured end to end between the support brackets from one frame member to the second frame member.

Aeroponic systems may include a growth chamber with at least one aeroponic module. Strips of exemplary cloth/fabric material may be sewn together and attached to frames in a substantially taut configuration to form a flat. In some exemplary embodiments, a single piece of fabric may include grommets to attach the fabric to a frame which may include cross members to support the fabric. Flats may be utilized for seeding, harvesting, and temporary storage prior to harvesting. Flats may be advanced through the growth chamber e.g., manually, automatically, and the like. Trays may be set on rails, which are located each side of the chamber, and advanced in a chain-like configuration. As flats reach an end of the growth chamber, a cutting apparatus (not shown) may be utilized to cut (i.e., harvest) the plants. A series of flats may further be placed end-to-end to extend the total length of the growth chamber. In another embodiment, aeroponic modules and/or a series of aeroponic modules can be stacked above one another, i.e., forming one growth chamber over another growth chamber to form an aeroponic tower. The use of multiple growth chambers and aeroponic towers may allow for tailoring of each grown chamber to the specific needs of the plants being grown therein, e.g., light, temperature, nutrient composition, delivery, space, and the like.

Figure 2:
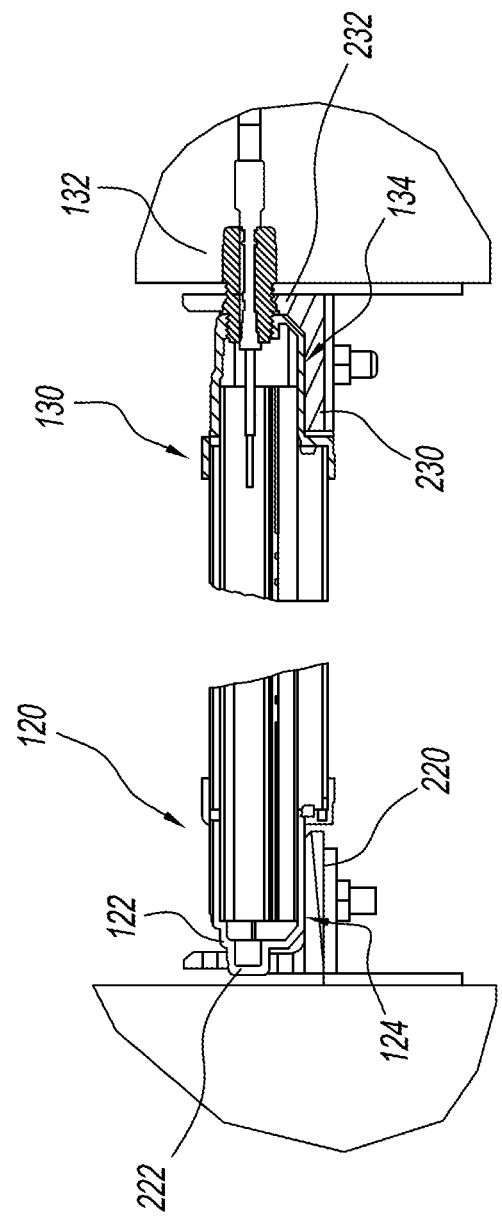
FIG. 2 is an illustration of an elongated LED lighting unit of the present disclosure, which is positioned on first and second support brackets.
Figure 3:
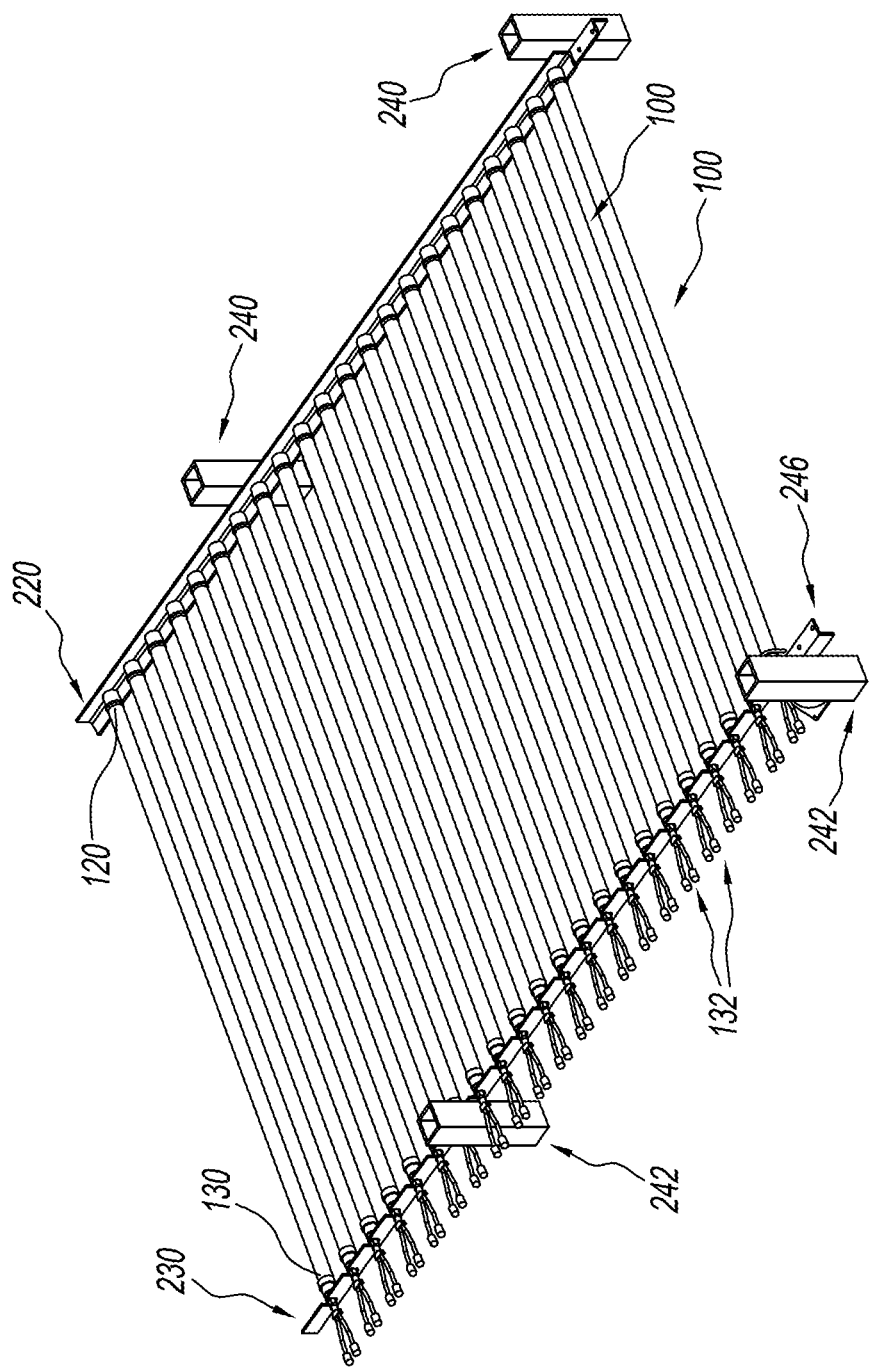
FIG. 3 is an illustration of multiple elongated LED lighting units having substantially parallel rows of support brackets and frame members. The support brackets and frame members can be part of an aeroponic growth tower.

With reference to FIGS. 1-3, embodiments of the disclosure relate to elongated LED lighting unit 100 structured to enable handling from at least one end which includes at least one electrical feedthrough. Elongated LED lighting units 100 can be positioned between parallel and horizontal rows of first and second support brackets/supports 220, 230, which are designed to directly/indirectly connect opposing vertical upright supports (i.e., frame members) 240, 242. Elongated LED lighting units 100 can be aligned and in electrical communication with additional, adjacent elongated LED lighting units located in close proximity to support brackets/supports 220, 230. In some embodiments, supports 220, 230 for lighting units 100 are parallel or substantially parallel, as illustrated in FIG. 3. Elongated LED lighting units 100 can be suspended between parallel and horizontal, or substantially parallel and horizontal, rows of first and second support brackets 220, 230 connected to vertical upright supports 240, 242, which can be used in a variety horticultural and multilevel horticultural applications, including, but not limited to, growth towers in aeroponic farming, greenhouses, hydroponic farming, and other applications that utilize multiple arrays of elongated LED lighting units 100. In some embodiments elongated LED lighting units 100 are positioned on supports in an aeroponic grow tower that can further include one or more stacked aeroponic modules.

Figure 4:
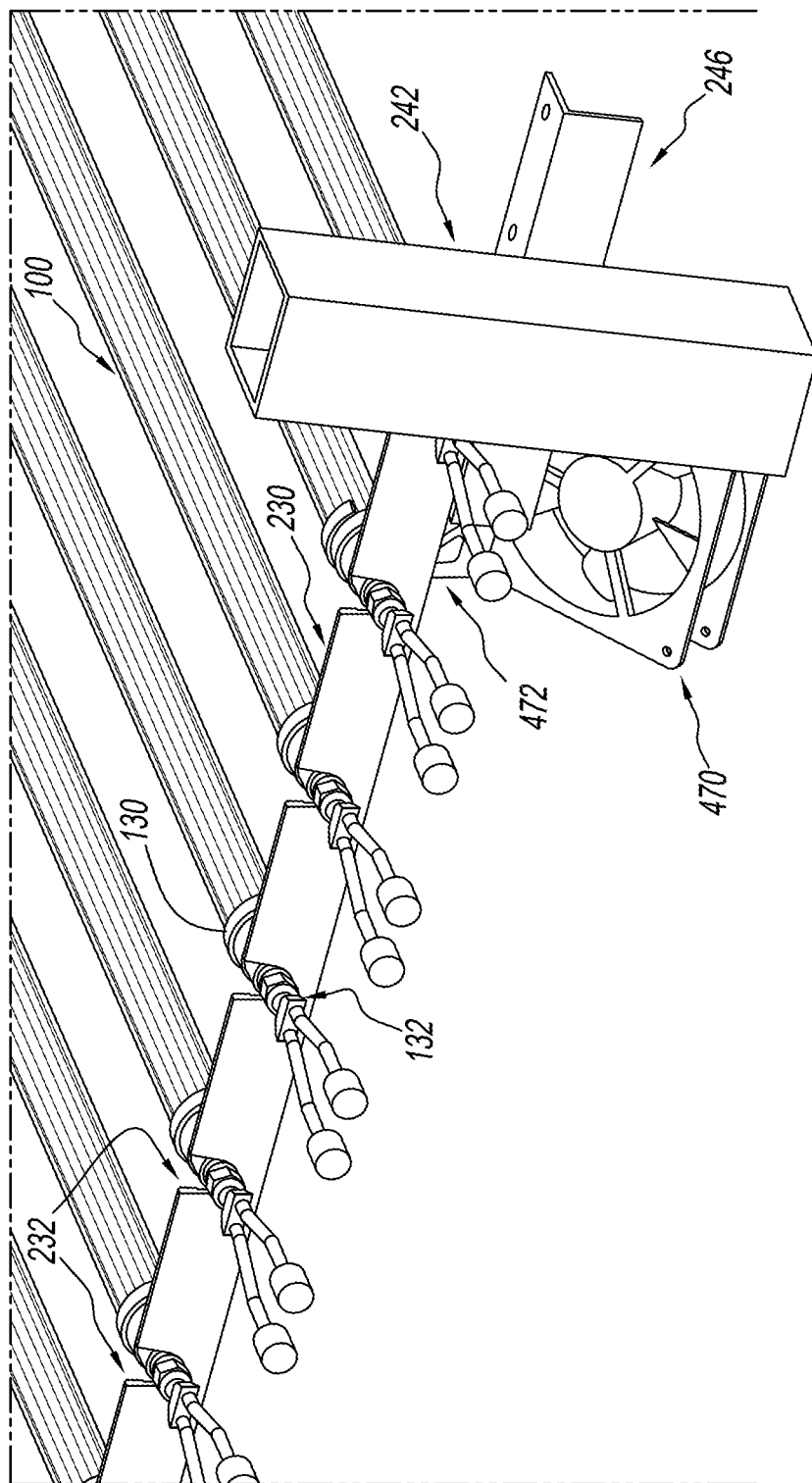
FIG. 4 is an illustration of one end of the elongated LED lighting units having endcaps with an electrical connection, the elongated LED lighting units are located in a portion of a support structure that includes a support bracket, mating features in the support bracket, and frame members connected to the support bracket.

A multi-layer horticultural structure can include main vertical upright supports 240, 242, which can be connected to a floor or other supporting surface, and one or more parallel, lateral, and horizontal supports, such as but not limited to supports 220, 230, and 246. The supports 220 and 230 for the elongated LED lamps 100 are substantially parallel and separated from one another and connected with vertical upright supports 240, 242 and other horizontal supports. Growing trays, drip pans, conduits to supply nutrients, and fan(s) 470 for circulating air (shown with optional fan support 472) can also be included and held by various supports (not shown), as depicted in FIG. 4.

Figure 8:
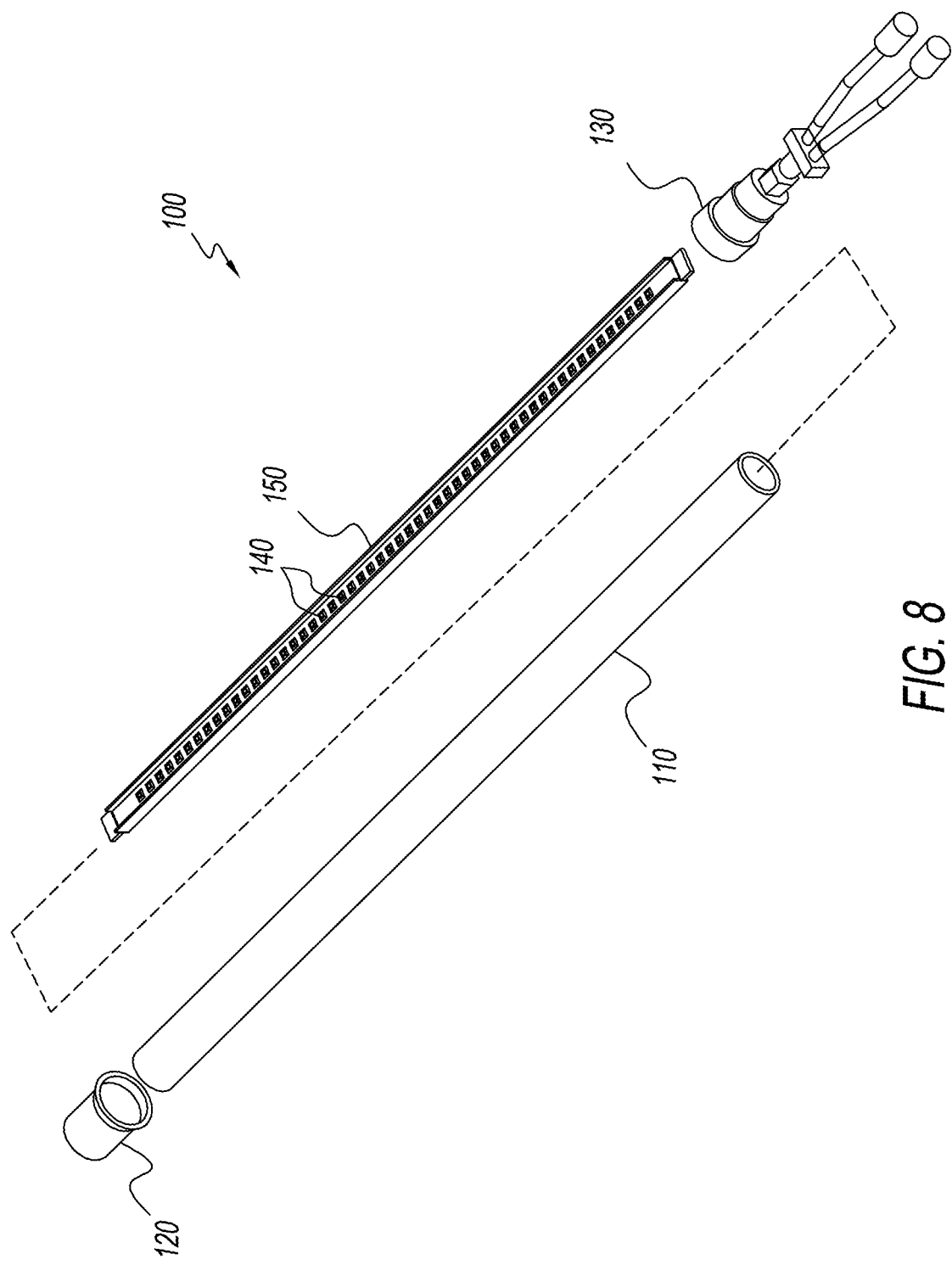
FIG. 8 illustrates an exploded view of an exemplary elongated LED lighting unit according to the present disclosure.

With further reference to FIGS. 1 and 8, elongated LED lighting unit 100 includes elongated transparent housing 110 with first endcap 120 and second endcap 130. First endcap 120, second endcap 130, and elongated transparent housing 110 enclose a plurality of solid state light emitting diode devices (LEDs) 140 that can be connected to a source of electrical current and may be positioned in close proximity to elongated heat sink 150 to facilitate heat transfer. Elongated heat sink 150 includes first end portion 152, which may longitudinally extend beyond first end 112 of transparent housing 110. First end portion 152 may further longitudinally extend beyond internal sealing surface 160 of first endcap 120. First end portion 152 may further contact and/or engage with internal surface 180 of first endcap 120. The distance first end portion 152 of elongated heat sink 150 extends is dependent on the intended design and use of elongated LED lighting unit 100. Elongated heat sink 150 includes second end portion 154, which may longitudinally extend beyond second end 114 of transparent housing 110. Second end portion 154 may further longitudinally extend beyond internal sealing surface 162 of second endcap 130. Second end portion 154 may further contact and/or engage with internal surface 190 of second endcap 130. The distance second end portion 152 of elongated heat sink 150 extends is dependent on the intended design and use of elongated LED lighting unit 100.

As further depicted in FIGS. 1 and 2, first endcap 120 includes external mating feature 122 and external cooperative surface 124, which are configured and dimensioned to interface with a corresponding mating feature of first support bracket 220 and a surface of first support bracket 220. External cooperative surface 124 and first support bracket 220 may interface such that the two surfaces complement each other. In one implementation, external cooperative surface 124 may be substantially flat (or flat). First endcap 120 further includes internal surface 166 that is configured and dimensioned to directly/indirectly engage with a portion of first end 112 of transparent housing 110. Internal surface 166 may be configured such that the dimension between opposing internal surfaces 166 is slightly larger than the outer surface of transparent housing 110. Internal surface 166 may be used to seal first endcap 120 with transparent housing 110. In an exemplary embodiment, internal surface 166 may be configured and dimensioned to interface with first end 112 of transparent housing 110 in a press-fit configuration, wherein the outer diameter of first end 112 of transparent housing 110 is substantially equal to or slightly larger than the diameter of internal surface 166.

Second endcap 130 includes electrical feedthrough 132 and external cooperative surface 134, which is configured and dimensioned to interface with a corresponding mating feature of second support bracket 230 and a surface of second support bracket 230. In one implementation, external cooperative surface 134 may be substantially flat (or flat). Second endcap 130 further includes internal surface 168 that is configured and dimensioned to directly/indirectly engage with a portion of second end 114 of transparent housing 110. Internal surface 168 may be configured such that the dimension between opposing internal surfaces 168 is slightly larger than the outer surface of transparent housing 110. Internal surface 168 may be used to seal second endcap 130 with transparent housing 110. In an exemplary embodiment, internal surface 168 may be configured and dimensioned to interface with second end 114 of transparent housing 110 in a press-fit configuration, wherein the outer diameter of second end 114 of transparent housing 110 is substantially equal to or slightly larger than the diameter of internal surface 168. In yet another exemplary embodiment, electrical feedthrough 132 of second endcap 130 may be an alignment and/or mating feature.

Endcaps 120, 130 may further include internal cavity/slot (not shown) that longitudinally extends beyond internal surface 166, 168, wherein internal cavity/slot (not shown) may house LED lamp heat sink 150, when extended beyond first end 112 and/or second end 114 of transparent housing 110. Particularly, as illustrated by FIG. 1, internal cavity (not shown) surrounds first end portion 152 and second end portion 154 of heat sink 150. Heat sink 150 may be secured to endcaps 120, 130 by bonding end portions 152, 154 to internal surfaces 180, 190, 690 using an adhesive or mechanical fastener.

Figure 6:
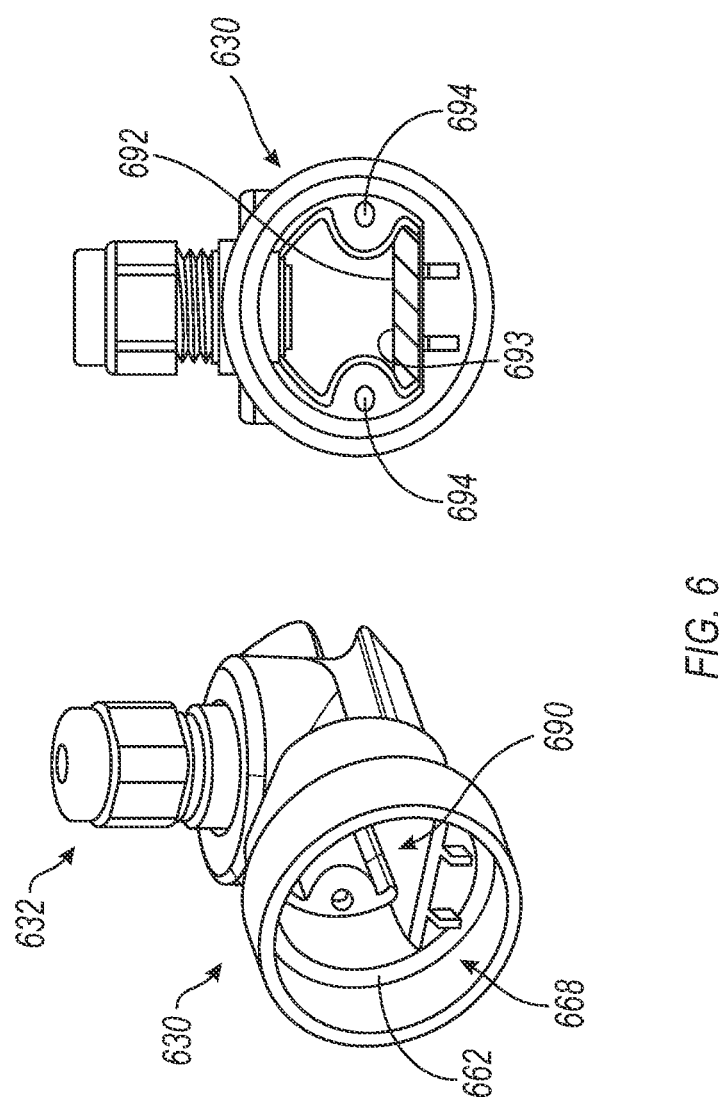
FIG. 6 is an illustration of an endcap in an embodiment of the disclosure with an electrical connection, sealing surfaces that contact the transparent housing, and an internal slot with a flat surface that engages a portion of the elongated heat sink.

For example, as depicted in FIG. 6, end portions 152, 154 of heat sink 150 may be inserted (e.g., fit or press fit) into heat sink cavity/slot 692 formed in endcap(s) 120, 130. Heat sink slot 692 can include surface 690 and side portions of fastener slots (694); other positioning slots can be used with or in place of fastener slots to form heat sink slot 692. Fasteners (not shown) can be inserted through fastener slots 694 in endcap 120, 130 and used to further secure an end of heat sink 150 with heat sink slot 692 (e.g., using a bolt and locking nut). In another embodiment, slots 694 may include features to engage with heat sink 150. Heat sink 150 may further include corresponding features for engagement with slots 694. Gasket 163, for example an o-ring, can be associated with sealing surface 162, 662 to seal end portion 112, 114 of transparent housing 110 to endcap 120, 130, 630. In some embodiments, an o-ring may be placed in a groove within a sealing surface 160, 162, 690 and/or end portion/end surface 112, 114 of transparent housing 110 and used to seal transparent endcaps 120, 130 to transparent housing 110. Gasket 163, when engaged, may provide for a water-tight seal.

Engagement of internal surface 166, 168, 668 of endcap 120, 130 with the outer surface of end portion 112, 114 of transparent housing 110, combined with the engagement of end portion 152, 154 of heat sink 150 with internal surface 180, 190 of endcap 120, 130, creates an overlapping joint that provides strength to elongated LED lighting unit 100. As previously stated, elongated LED lighting unit 100 may engage with support brackets 220, 230.

In yet another exemplary embodiment of this disclosure, a method of installing elongated LED lighting unit 100 positioned between substantially parallel and horizontal rows of first and second support brackets 220, 230, which are in close proximity to vertical upright supports 240, 242. Elongated LED lighting unit 100 includes elongated transparent housing 110 with first endcap 120 and second endcap 130, with electrical connector 132 connected thereto. First endcap 120, second endcap 130, and elongated transparent housing 110 enclose a plurality of solid state lighting devices 140 that are in close proximity to elongated heat sink 150 to facilitate heat transfer. In one implementation, solid state lighting devices 140 may be fixed to elongated heat sink 150. Elongated heat sink 150 includes first end portion 152, which extends longitudinally beyond first end 112 of transparent housing 110, and further extending longitudinally beyond sealing surface 160 within first endcap 120, thereby being in close proximity to internal surface 180 of first endcap 120. Elongated heat sink 150 may contact and/or engage with internal surface 180 of first endcap 120. Elongated heat sink 150 includes second end portion 154, which extends longitudinally beyond second end 114 of transparent housing 110, and further extending longitudinally beyond sealing surface 162 within second endcap 130, thereby being in close proximity to internal surface 190 of second endcap 130. Elongated heat sink 150 may contact with and/or engage with internal surface 190 of second endcap 130.

The above-mentioned method includes the acts or steps of positioning any one of the disclosed elongated LED lighting units 100 in close proximity to first and second support brackets 220, 230. Particularly, positioning first endcap 120 of elongated LED lighting unit 100, which includes external cooperative surface 124 and external mating feature 122, with first support bracket 220, which includes corresponding mating feature 222. Positioning second endcap 130 of elongated LED lighting unit 100, which includes external cooperative surface 134 and electrical feedthrough 132, onto second support bracket 230 with corresponding mating feature 232. External cooperative surfaces 124, 134 of endcaps 120, 130 contact a surface of the corresponding support brackets 220, 230. External cooperative surfaces 124, 134 and support brackets 220, 230 may interface such that the two surfaces complement each other. In one embodiment, electrical connection/feedthrough 132 of second endcap 130 may be utilized as an alignment feature. In some embodiments, elongated LED lighting units 100 are positioned on supports 220, 230 in an aeroponic grow tower that includes one or more stacked aeroponic modules. In other embodiments, endcaps 120, 130 may be fastened to support brackets 220, 230 using at least one fastener.

In some embodiments, elongated LED lighting units 100 can be installed without securing elongated LED light unit 100 to one or more support brackets 220, 230 with a fastener. Advantageously, elongated LED lighting unit 100 in embodiments of the disclosure can be positioned by lowering electrical connector 132 into support bracket mating feature 232, and in some embodiments elongated LED lighting unit 100 may be positioned by lowering electrical feedthrough 132 on endcap 130 onto or into mating feature 232 of support bracket 230. The method of installing elongated LED lights 100 may further include the act or step of connecting first electrical connector 132 of first elongated LED lighting unit 100 to second electrical connector 132 of second elongated LED lighting unit 100. In some instances, the connection may be performed on the same bracket where elongated LED lighting unit 100 is connected to a source of power. In some embodiments, electrical feedthrough 132 of second endcap 130 may be further utilized as a mating feature.

Figure 7C:
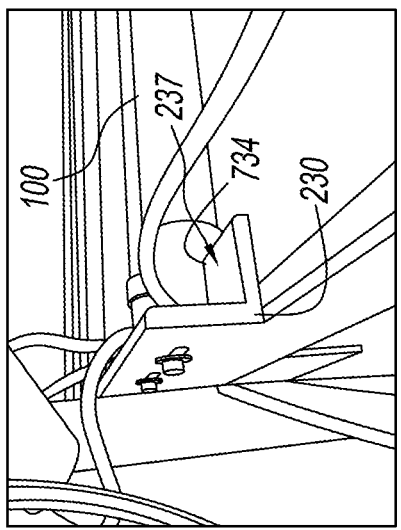
FIGS. 7A-7F illustrate another embodiment of an elongated LED lighting unit with one or more electrical connectors extending from one endcap unit positioned between parallel support brackets. Each endcap is engaged and aligned with a mating feature on the support bracket.
Figure 7F:
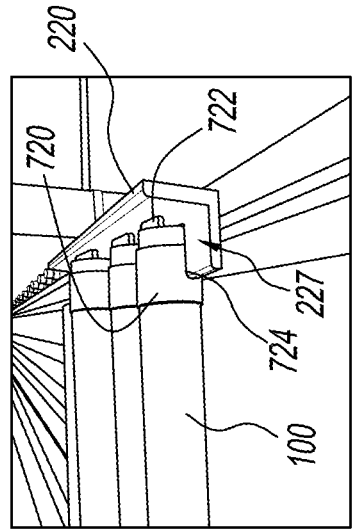
Figure 7B:
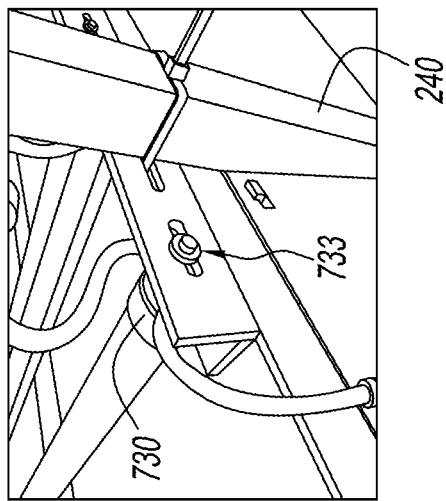
Figure 7E:
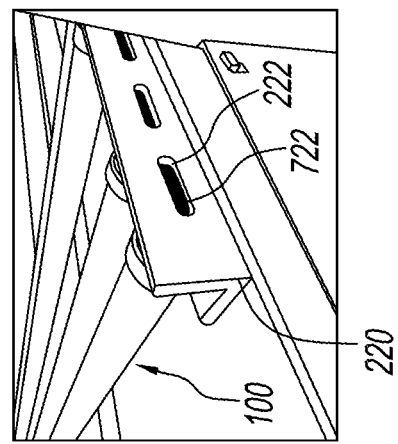
Figure 7A:
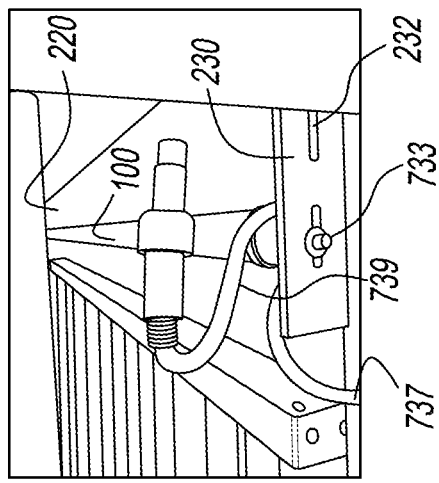
Figure 7D:
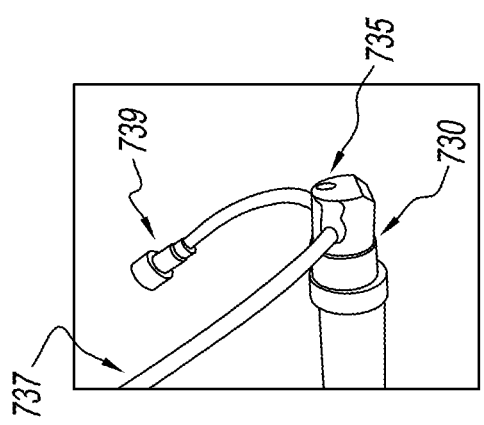

FIGS. 7A-7F illustrate a non-limiting example of elongated LED lighting unit 100 with one or more electrical connectors/feedthroughs 737, 739 positioned within endcap 730, which further includes mating feature 735, which can be secured to support bracket 230 using fastener 733. In an exemplary embodiment, second endcap 730 may include dual electrical connectors 737, 739, as depicted in FIG. 7D. Endcaps 720, 730 of elongated LED lighting unit 100 may be positioned between support brackets 220, 230. (See, FIGS. 7A-7C, and 7E-7F). Support bracket 230 may further be connected to upright frame member 240. External cooperative surface 734 (e.g., flat surface) of second endcap 730 may contact support surface 237 of support 230 of elongated lighting unit 100. External mating feature 722 of first endcap 720 may be associated with corresponding slot feature 222 of support bracket 220. External cooperative surface 724 (e.g., flat surface) of first endcap 720 may contact surface 227 of support 220. External cooperative surface 724 and contact surface 227 may interface such that the two surfaces complement each other. As illustrated in FIGS. 7A-7C and 7E-7F, each endcap may be engaged and aligned with a mating feature on the corresponding support bracket.

In other embodiments where endcap 130, 630 includes a single electrical feedthrough/connector 132, 632, electrical connector 132 can be the mating feature that interfaces with a corresponding feature, similar to mating feature 232 disclosed in FIGS. 2 and 4. However, such mating feature is not limited to mating feature 232 and additional designs may be incorporated without departing from the spirit/scope of this disclosure.

In some embodiments, internal surface 180, 190, 690 of endcap 120, 130 that contacts or engages with end portions 152, 154 of heat sink 150 may include a flat portion (see flat portion 693 in FIG. 6) that overlaps a portion of external cooperative surface 124, 134. In some embodiments, internal surface 180, 190 and corresponding external cooperative surface 124, 134 are parallel. In other embodiments, external cooperative surface 124 of first endcap 120 and external cooperative surface 134 of second endcap 130 are parallel and co-planar. In additional embodiments, internal surface 180, 190 of endcaps 120, 130 are further bound by locating features which create a cavity within the endcap to secure heatsink 150. FIG. 6 illustrates non-limiting embodiments wherein locating features 694 can also function as screw slots to interface with end portions 152, 154 of heat sink 150. In some embodiments, external cooperative surface 124, 134 is dimensioned to be substantially the width of corresponding cooperative surface of support bracket 220, 230.

Figure 5:
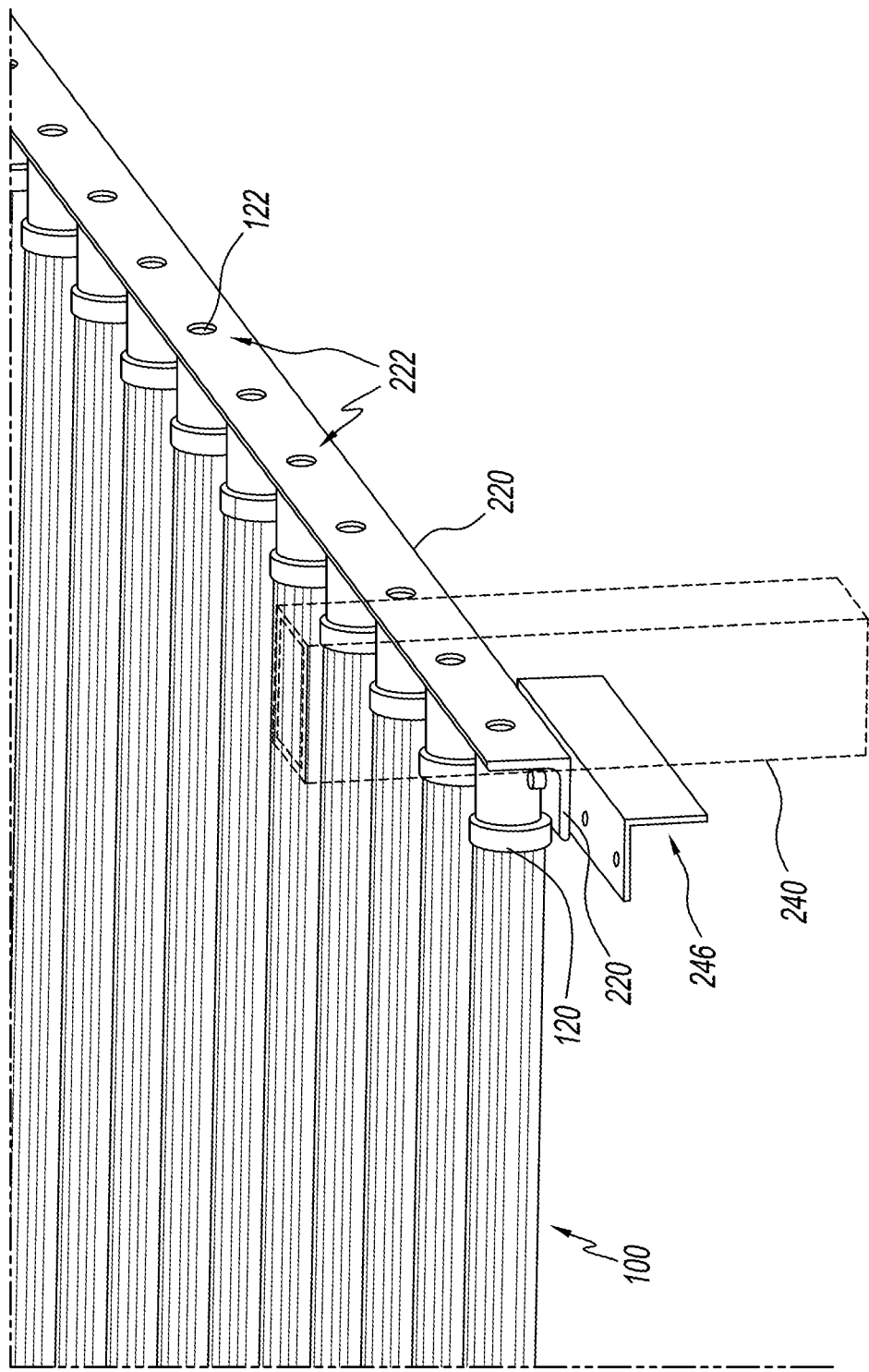
FIG. 5 is an illustration of one end of the elongated LED lighting units having endcaps that include an external mating feature. The elongated LED lighting units are located in a portion of the support structure that includes a support bracket, mating feature, and frame members connected to the support bracket. The endcap includes a protrusion or external mating feature that locates in a corresponding feature of the support bracket.

With further reference to FIGS. 3-5, elongated LED lighting units 100 may be located within a portion of a growth tower that is positioned on support brackets 220, 230, which are connected with frame members 240, 242, 246. In these figures, elongated lighting units 100 include one endcap with a single electrical connection 132 and another endcap without an electrical connection, but with an external mating feature. In this embodiment, electrical connection 132 positioned within endcap 130 further provides for a support feature, which may be positioned and/or located within mating features 232 of support bracket 230. Advantageously, in this embodiment, there is no mechanical connection, such as a screw, bolt, or top mounted clip, holding elongated lighting unit 100 in position. Endcap 130 of elongated LED unit 100 rests on flat plane 134 of endcap 130, thereby mating with the horizontal part of support 230. Mating features 232 in the vertical portion of support bracket 230, in this example depicted as an "L" bracket, and waterproof electrical connector 132 are sized so that under normal circumstances, the waterproof connector 132 does not bottom out on mating feature 232 and is not supporting the weight of elongated LED lighting unit 100. FIG. 5 shows endcap 120 of elongated LED unit 100 positioned on support bracket 220. Elongated LED lighting units 100 are located in a portion of a growth tower having support bracket 220 and frame members 240, 246. Endcap 120 of each LED lighting unit 100 includes a protrusion or external mating feature 122 that interfaces with corresponding feature 222, in this case a round hole on support bracket 220.

Advantageously elongated LED lighting units 100 that include a single electrical connector 132 that also functions as a mating feature, may enable the adjacent mounting of additional units 100 with little or no spacing therebetween. The disclosed spacing may promote flexibility in the design and intensity of the light delivered to the substrates located below the LED lights.

One embodiment of the disclosure is a method of fabricating elongated LED lighting unit 100 for substantially parallel and horizontal rows of first and second support brackets 220, 230, connecting vertical upright supports 240, 242. The method can include elongated transparent housing 110 that encloses a plurality of solid state lighting devices 140, wherein solid state lighting devices 140 are positioned in close proximity to elongated heat sink 150 to facilitate heat transfer. In some embodiments, solid state lighting devices 140 are fixed to elongated heat sink 150. Elongated heat sink 150 includes first end portion 152, which extends longitudinally beyond first end 112 of transparent housing 110 and elongated heat sink 150 includes second end portion 154, which longitudinally extends beyond second end 114 of elongated transparent housing 110. Fixturing second end portion 154 of heat sink 150, which longitudinally extends beyond second end 114 of transparent housing 110, into internal slot 190 (similar to slot 692 in FIG. 6) of second endcap 130, wherein second endcap 130 further includes electrical feedthrough 132 and external cooperative surface 134 (e.g., external flat surface), which are adapted to contact a corresponding mating feature on second support bracket 232 and surface 237 of second support bracket 232, respectively. External cooperative surface 134 and surface 237 may interface such that the two surfaces complement each other. Furthermore, internal slot 190, 692 of second endcap 130 may overlap a portion of external cooperative surface 134 (e.g., external flat surface) of second endcap 130.

Fixturing may further provide a waterproof seal between sealing surface 162 of second endcap 130 and second end portion 114 of transparent housing 110.

The method of fabrication can further include the act or step of fixturing first end portion 152 of elongated heat sink 150, which longitudinally extends beyond first end 112 of transparent housing 110, into internal slot 180 (similar to slot 692 in FIG. 6) of first endcap 120. First endcap 120 further includes external mating feature 122 and external cooperative surface 124 (e.g., external flat surface), which are adapted to contact a corresponding mating feature on first support bracket 220 and surface 227 of first support bracket 220, respectively. External cooperative surface 124 and surface 227 may interface such that the two surfaces complement each other. Furthermore, internal slot 180 of first endcap 120 may overlap a portion of external cooperative surface 124 of first endcap 120. Fixturing can further provide a waterproof seal between sealing surface 160 of first endcap 120 and first end portion 112 of transparent housing 110.

As depicted in FIG. 1, transparent housing 110 and endcaps 120, 130 may be sealed together. The seal, as stated previously, may be water proof. In some embodiments, the seal may be gasket 161, 163, which is compressed between endcap sealing surfaces 160, 162. Other seal types and/or sealants can also be used to provide a water tight joint between endcaps 120, 130 and transparent housing 110, as will be known in the art. For example, epoxy, rubber, caulk, o-ring, and any combination thereof. In some embodiments, a sealant may be used to enhance the mechanical strength of and provide a waterproof seal between endcap inner surfaces 166, 168 and transparent housing end portions 112, 114. Endcaps 120, 130 may include the necessary tolerances such that the gasket or other sealing method will sufficiently compress when mechanical interferences start to limit travel of a fastener (e.g., screw) between endcap 120, 130 and heat sink 150. Endcaps 120, 130 may also include features that enable gasket 161, 163 to expand when mechanical tolerance on transparent housing 110 and endcaps 120, 130 create a situation where gasket 161, 163 is overly compressed beyond a predetermined limit. Waterproof seals may be further included between electrical feedthrough 132 and endcap 130.

The following clauses further define particular aspects and embodiments of the invention.

Clause 1. An elongated LED lighting unit for substantially parallel and substantially horizontal rows of first and second support brackets connecting vertical upright supports and including an elongated transparent housing with a first endcap and a second endcap; the first endcap, second endcap, and elongated transparent housing enclose a plurality of solid state lighting devices fixed to an elongated heat sink, the elongated heat sink has a first end portion that extends beyond a first end of the transparent housing, extends past a sealing surface in the first endcap, and contacts an internal surface in the first endcap, the elongated heat sink has a second end portion that extends beyond a second end of the transparent housing, extends past a sealing surface in the second endcap, and contacts an internal surface in the second endcap, the first end cap includes an external mating feature and an external cooperative surface being adapted to mate with a corresponding mating feature on the first support bracket and a surface of the first support bracket, the first endcap has internal surface that overlaps a portion of the first end of the transparent housing; and the second endcap includes an electrical feedthrough and an external cooperative surface being adapted to contact a corresponding mating feature on the second support bracket and a surface of the second support bracket, the second endcap has an internal surface that overlaps a portion of the second end of the transparent housing.

Clause 2. The elongated LED lighting unit of clause 1 where the electrical feedthrough on the second endcap is a mating feature.

Clause 3. The elongated LED lighting unit of clause 1 where the second endcap further includes a mating feature.

Clause 4. The elongated LED lighting unit as in any one of clauses 1-3 wherein the external cooperative surface of the first endcap or the external cooperative surface of the second endcap has a dimension that is substantially the width of the support bracket.

Clause 5. The elongated LED lighting unit as in any one of clauses 1-4 wherein internal surface of the endcap has a flat portion that overlaps a portion of the external cooperative surface of the endcap.

Clause 6. The elongated LED lighting unit as in any one of clauses 1-5 wherein the second endcap includes a mating feature and a waterproof seal between the second endcap and the electrical feedthrough.

Clause 7. The elongated LED lighting unit as in any one of clauses 1-6 wherein one or more of the first endcap or second endcap further includes an internal slot that engages an end portion the elongated heat sink.

Clause 8. The elongated LED lighting unit as in any one of clauses 1-7 further including a waterproof seal between the sealing surface of the first endcap and the first end of the transparent housing and a waterproof seal between the sealing surface of the second endcap and the second end portion of the transparent housing.

Clause 9. The elongated LED lighting unit as in any one of clauses 1-8 wherein the external cooperative surface of the first endcap and the external cooperative surface of the second endcap are parallel.

Clause 10. The elongated LED lighting unit as in any one of clauses 1-9 wherein the external cooperative surface of the first endcap and the external cooperative surface of the second endcap are parallel and co-planar.

Clause 11. The elongated LED lighting unit as in any one of clauses 1-10 wherein the parallel and horizontal, or substantially parallel and horizontal, rows of first and second support brackets interconnecting vertical upright supports include stacked aeroponic modules.

Clause 12. A method of installing an elongated LED lighting unit onto substantially parallel and substantially horizontal rows of first and second support brackets connecting vertical upright supports, said elongated LED lighting unit including an elongated transparent housing with a first endcap that is free of an electrical feedthrough and a second endcap that has an electrical feedthrough; the first endcap, second endcap, and elongated transparent housing enclose a plurality of solid state lighting devices fixed to an elongated heat sink, the elongated heat sink has a first end portion that extends beyond a first end of the transparent housing, extends past a sealing surface in the first endcap, and contacts an internal surface in the first endcap, the elongated heat sink has a second end portion that extends beyond a second end of the transparent housing, extends past a sealing surface in the second endcap, and contacts an internal surface in the second endcap;

positioning the first endcap of the elongated LED lighting unit that includes an external cooperative surface and an external mating feature onto a first parallel and horizontal support bracket with a corresponding mating feature; and positioning the second endcap of the elongated LED lighting unit that includes an external cooperative surface and an electrical feedthrough onto a second parallel and horizontal support bracket with a corresponding mating feature.

Clause 13. The method of clause 12 further including the act or step of securing the elongated LED light unit to one or more support brackets with a fastener.

Clause 14. The method as in any one of clauses 12-13 wherein the elongated LED light unit is positioned by lowering the electrical connector into a support bracket mating feature.

Clause 15. The method as in any one of clauses 12-14 further including the act or step of connecting the electrical feedthrough of the elongated LED lighting unit to a source of power and a second elongated LED lighting unit on the same bracket, the second elongated LED lighting unit has a second endcap that has an electrical feedthrough.

Clause 16. The method as in any one of clauses 12-15 where the electrical feedthrough on the second endcap is a mating feature.

Clause 17. The method as in any one of clauses 12-16 where the second endcap further includes a mating feature.

Clause 18. The method as in any one of clauses 12-17 wherein the external cooperative surface of the first endcap or the external cooperative surface of the second endcap has a dimension that is substantially the width of the support bracket.

Clause 19. The method as in any one of clauses 12-18 wherein internal surface of the endcap has a flat portion that overlaps a portion of the external cooperative surface of the endcap.

Clause 20. The method as in any one of clauses 12-19 wherein the second endcap includes a mating feature and a waterproof seal between the second endcap and the electrical feedthrough.

Clause 21. The method as in any one of clauses 12-20 wherein one or more of the first endcap or second endcap further includes an internal slot that engages an end portion the elongated heat sink.

Clause 22. The method as in any one of clauses 12-21 further including a waterproof seal between the sealing surface of the first endcap and the first end of the transparent housing and a waterproof seal between the sealing surface of the second endcap and the second end portion of the transparent housing.

Clause 23. The method as in any one of clauses 12-22 wherein the external cooperative surface of the first endcap and the external cooperative surface of the second endcap are parallel.

Clause 24. The method as in any one of clauses 12-23 wherein the external cooperative surface of the first endcap and the external cooperative surface of the second endcap are parallel and co-planar.

Clause 25. The method as in any one of clauses 12-24 wherein the support brackets include the structure of an aeroponic growing tower.

Clause 26. A method of making an elongated LED lighting unit for substantially parallel and horizontal rows of first and second support brackets connecting vertical upright supports and including an elongated transparent housing that encloses a plurality of solid state lighting devices, said solid state lighting devices fixed to an elongated heat sink, the elongated heat sink has a first end portion that extends beyond a first end of the transparent housing and the elongated heat sink has a second end portion that extends beyond a second end of the elongated transparent housing fixturing the second end portion of the heat sink that extends beyond the second end of the elongated housing into an internal slot in a second endcap, the second endcap further includes an electrical feedthrough and an external flat surface being adapted to contact a corresponding mating feature on a second support bracket and a surface of the second support bracket, the second endcap internal slot overlaps a portion of the external cooperative surface of the second endcap.

Clause 27. The method of clause 26 wherein the fixturing is a waterproof seal between a sealing surface of the second endcap and the second end portion of the transparent housing.

Clause 28. The method as in any one of clauses 26-27 further including the act or step of fixturing the first end portion of the heat sink that extends beyond the first end of the elongated housing into an internal slot in a first endcap, the first endcap further includes an external mating feature and an external cooperative surface being adapted to contact a corresponding mating feature on a first support bracket and a surface of the first support bracket, the first endcap internal slot overlaps a portion of the external cooperative surface of the first endcap.

Clause 29. The method of clause 28 wherein the fixturing is a waterproof seal between a sealing surface of the first endcap and the first end portion of the transparent housing.

Clause 30. The method as in any one of clauses 12-24 wherein elongated LED lighting unit further includes the substantially parallel and substantially horizontal rows of first and second support brackets connecting vertical upright supports in an aeroponic growing tower.

Clause 31. The elongated LED lighting unit as in any one of clauses 1-11 further including the substantially parallel and substantially horizontal rows of first and second support brackets connecting vertical upright supports in an aeroponic growing tower.

Approximating language, as used herein throughout the specification and claims, may be applied to modify any quantitative or qualitative representation that could permissibly vary without resulting in a change in the basic function to which it is related. Accordingly, a value modified by a term such as "about" or numerical ranges is not to be limited to a specified precise value, and may include values that differ from the specified value. In at least some instances, the approximating language may correspond to the precision of an instrument for measuring the value.

It will be apparent to those skilled in the art that various modifications and variations can be made in the method and system of the present disclosure without departing from the spirit or scope of the disclosure. Thus, it is intended that the present disclosure include modifications and variations that are within the scope of the appended claims and their equivalents.

While the disclosure has been described in detail in connection with only a limited number of aspects and embodiments, it should be understood that the disclosure is not limited to such aspects. Rather, the disclosure can be modified to incorporate any number of variations, alterations, substitutions, or equivalent arrangements not heretofore described, but which are commensurate with the scope of the claims. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

The invention claimed is:

1. An elongated LED lighting unit for suspension between substantially parallel rows of first and second support brackets connecting vertical upright supports, the elongated LED lighting unit comprising:
   an elongated transparent housing;
   a first endcap mounted with respect to the elongated transparent housing at a first end of the elongated transparent housing;
   a second endcap mounted with respect to the elongated transparent housing at a second end of the elongated transparent housing; wherein the first endcap, the second endcap, and the elongated transparent housing enclose a plurality of solid state light emitting diode devices fixed to an elongated heat sink; the elongated heat sink positioned in part within the elongated transparent housing;
   the first endcap comprises a first endcap internal sealing surface positioned perpendicularly to a first endcap internal surface and has a first endcap internal cavity within the first endcap, the first endcap internal surface overlaps an outer surface of a first end portion of the elongated transparent housing beyond which a first end of the elongated heat sink extends and the first endcap internal sealing surface forms a water tight seal between the first end of the elongated transparent housing and the first endcap internal sealing surface, the first endcap internal cavity extends longitudinally beyond the first end of the elongated transparent housing;
   the second endcap comprises a second endcap internal sealing surface positioned perpendicularly to a second endcap internal surface and has a second endcap internal cavity within the second endcap, the second endcap internal surface overlaps an outer surface of a second end portion of the elongated transparent housing beyond which a second end of the elongated heat sink extends and the second endcap internal sealing surface forms a water tight seal between the second end of the elongated transparent housing and the second endcap internal sealing surface, the second endcap internal cavity extends longitudinally beyond the second end of the elongated transparent housing;
   wherein the first end of the elongated heat sink (i) extends beyond the first end of the elongated transparent housing, (ii) extends past and overlaps the internal sealing surface positioned within the first endcap and the water tight seal between the first end of the elongated transparent housing and the first endcap internal sealing surface, and (iii) is secured by insertion into a heat sink slot in the internal cavity of the first endcap and contacts an internal surface in the heat sink slot of the first endcap, (iv) wherein the second end of the elongated heat sink extends beyond the second end of the elongated transparent housing, (v) extends past and overlaps the internal sealing surface positioned within the second endcap and the water tight seal between the second end of the elongated transparent housing and the second endcap internal sealing surface and (vi) is secured by insertion into a heat sink slot in the internal cavity of the second endcap and contacts an internal surface in the heat sink slot of the second endcap;
   the first endcap further comprises a first endcap external mating feature and a first endcap external cooperative surface, the first endcap external mating feature being adapted to contact a corresponding mating feature of the first support bracket and the first endcap external cooperative surface being adapted to rest on a surface of the first support bracket, the internal surface in the heat sink slot of the first endcap overlaps a portion of the first endcap external cooperative surface; and
   the second endcap further comprises a second endcap electrical feedthrough mating feature and a second endcap external cooperative surface, the second endcap electrical feedthrough mating feature being adapted to contact a corresponding mating feature on the second support bracket and the second endcap external cooperative surface being adapted to rest on a surface of the second support bracket, the internal surface in the heat sink slot of the second endcap overlaps a portion of the second endcap external cooperative surface.

2. The elongated LED lighting unit of claim 1, further comprising a sealant between the first endcap internal surface that overlaps the outer surface of the first end portion of the elongated transparent housing and a sealant between the second endcap internal surface that overlaps the outer surface of the second end of the elongated transparent housing.

3. The elongated LED lighting unit of claim 1, wherein the first end of the elongated heat sink secured by insertion into the heat sink slot is press fit into the heat sink slot of the first endcap and the second end of the elongated heat sink secured by insertion into the heat sink slot is press fit into the heat sink slot of the second endcap.

4. The elongated LED lighting unit of claim 1, wherein the first end of the elongated heat sink is bonded to the internal surface in the heat sink slot of the first endcap and the second end of the elongated heat sink is bonded to the internal surface in the heat sink slot of the second endcap.

5. The elongated LED lighting unit of claim 1, wherein the heat sink slot of the first endcap further comprises side portions of fastener slots and the heat sink slot of the second endcap further comprises side portions of fastener slots.

6. The elongated LED lighting unit of claim 1, wherein the water tight seal between the first end of the elongated transparent housing and the first endcap comprises a gasket and the water tight seal between the second end of the elongated transparent housing and the second endcap comprises a gasket.

7. The elongated LED lighting unit of claim 6, wherein the first end of the elongated heat sink is bonded to the internal surface in the heat sink slot of the first endcap and the second end of the elongated heat sink is bonded to the internal surface in the heat sink slot of the second endcap.

\* \* \* \* \*